United States Patent
Marvin et al.

(10) Patent No.: US 11,356,503 B2
(45) Date of Patent: Jun. 7, 2022

(54) SYSTEMS AND METHODS FOR HYBRID BURST OPTIMIZED REGULATED WORKLOAD ORCHESTRATION FOR INFRASTRUCTURE AS A SERVICE

(71) Applicant: JPMORGAN CHASE BANK, N.A., New York, NY (US)

(72) Inventors: Darren Marvin, Poole (GB); Thomas Williams, Poole (GB); Lee Staples, Bournemouth (GB); Rupert Pigott, Bournemouth (GB); Donald Harper, Katy, TX (US); Nelson M. Pereira, New York, NY (US); Sandeep Sarthavalli Ramesh, Bournemouth (GB); Charles Parkin, Poole (GB); Brian Todd, Bournemouth (GB); Minlin Gao, Livingston, NJ (US); Julian Leggett, Old Coulsdon (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/556,975

(22) Filed: Aug. 30, 2019

(65) Prior Publication Data
US 2020/0076885 A1    Mar. 5, 2020

Related U.S. Application Data

(60) Provisional application No. 62/724,667, filed on Aug. 30, 2018.

(51) Int. Cl.
*H04L 67/1008* (2022.01)
*H04L 47/76* (2022.01)
(Continued)

(52) U.S. Cl.
CPC ........ *H04L 67/1008* (2013.01); *G06F 9/5072* (2013.01); *H04L 41/0893* (2013.01);
(Continued)

(58) Field of Classification Search
CPC .............. G06F 9/5072; H04L 41/0893; H04L 41/5019; H04L 47/76; H04L 63/102; H04L 67/1008
See application file for complete search history.

(56) References Cited

U.S. PATENT DOCUMENTS

| 7,739,155 B2 * | 6/2010 | Fellenstein | ............ G06Q 10/06 705/26.3 |
| 8,239,538 B2 * | 8/2012 | Zhang | ................... G06F 9/5094 709/226 |

(Continued)

OTHER PUBLICATIONS

Hon, W. Kuan et al. "Data Protection Jurisdiction and Cloud Computing—When Are Cloud Users and Providers Subject to EU Data Protection Law: The Cloud of Unknowing", International Review of Law, Computers & Technology, vol. 26, Nos. 2-3, Jul.-Nov. 2012, 37 pages. (Year: 2012).*

(Continued)

*Primary Examiner* — George C Neurauter, Jr.
(74) *Attorney, Agent, or Firm* — Greenberg Traurig LLP

(57) ABSTRACT

Systems and methods for hybrid burst optimized regulated workload orchestration for infrastructure as a service are disclosed. According to one embodiment, in an information processing apparatus comprising at least one computer processor, a method for providing hybrid burst optimized regulated workload orchestration for infrastructure as a service may include: (1) receiving a job request for a job comprising at least one job requirement from a job requester; (2) calculating a cost of job for the job based on the at least one job requirement; (3) identifying an IaaS provider from a plurality of IaaS providers that meets the job (Continued)

requirements and the cost of job, wherein the plurality of IaaS providers comprises at least one on-premises IaaS provider and the at least one off-premises IaaS provider; (4) executing an IaaS request for the identified IaaS provider; and (5) monitoring execution of the job by the identified IaaS provider.

18 Claims, 2 Drawing Sheets

(51) Int. Cl.
  *G06F 9/50* (2006.01)
  *H04L 41/5019* (2022.01)
  *H04L 41/0893* (2022.01)
  *H04L 9/40* (2022.01)

(52) U.S. Cl.
  CPC ......... *H04L 41/5019* (2013.01); *H04L 47/76* (2013.01); *H04L 63/102* (2013.01)

(56) References Cited

U.S. PATENT DOCUMENTS

| | | | | |
|---|---|---|---|---|
| 8,539,078 | B2* | 9/2013 | Duan | G06F 9/505 709/226 |
| 8,548,863 | B2* | 10/2013 | Diwakar | G06Q 30/0641 705/26.1 |
| 8,549,147 | B2* | 10/2013 | Akiyama | G06F 9/5055 709/226 |
| 8,607,242 | B2* | 12/2013 | Clarke | G06F 9/5038 718/104 |
| 8,676,622 | B1* | 3/2014 | Ward, Jr. | G06Q 10/06313 705/7.12 |
| 8,713,163 | B2* | 4/2014 | Teather | G06F 11/3055 709/224 |
| 8,775,630 | B2* | 7/2014 | Zhang | H04L 29/08306 709/226 |
| 8,813,065 | B2* | 8/2014 | Zygmuntowicz | G06F 9/45558 717/174 |
| 8,838,801 | B2* | 9/2014 | Alapati | G06F 9/5072 709/226 |
| 8,914,515 | B2* | 12/2014 | Alapati | G06F 9/5072 709/226 |
| 8,924,559 | B2* | 12/2014 | Brown | G06Q 10/10 709/226 |
| 9,300,539 | B2* | 3/2016 | De | G06F 9/5072 |
| 9,342,367 | B2* | 5/2016 | Koneti | G06F 9/5055 |
| 9,419,917 | B2* | 8/2016 | Eaton | H04L 47/785 |
| 9,508,095 | B2* | 11/2016 | Stella | G06F 11/3006 |
| 9,626,223 | B2* | 4/2017 | Yan | G06F 9/5072 |
| 9,800,477 | B2* | 10/2017 | Burton | H04L 41/5029 |
| 10,212,078 | B2* | 2/2019 | Chao | H04L 45/586 |
| 10,250,451 | B1* | 4/2019 | Moghe | H04L 41/14 |
| 10,346,775 | B1* | 7/2019 | Xu | G06Q 10/06315 |
| 10,417,593 | B1* | 9/2019 | Norbeck, Jr. | G06F 16/3328 |
| 10,440,138 | B2* | 10/2019 | Yan | H04L 41/5096 |
| 10,452,451 | B2* | 10/2019 | Miraftabzadeh | G06F 9/5083 |
| 10,552,774 | B2* | 2/2020 | Shih | G06Q 10/06315 |
| 10,587,464 | B2* | 3/2020 | Coronado | H04L 67/10 |
| 10,671,953 | B1* | 6/2020 | Xu | H04L 41/0896 |
| 10,673,935 | B2* | 6/2020 | Son | G06F 9/46 |
| 10,693,989 | B2* | 6/2020 | Eberlein | H04L 67/10 |
| 10,769,687 | B2* | 9/2020 | O'Sullivan | H04L 41/5041 |
| 2008/0320482 | A1* | 12/2008 | Dawson | G06F 9/5072 718/104 |
| 2010/0332262 | A1* | 12/2010 | Horvitz | G06Q 30/06 705/4 |
| 2011/0055034 | A1* | 3/2011 | Ferris | G06Q 30/0601 705/26.1 |
| 2011/0138050 | A1* | 6/2011 | Dawson | H04L 67/327 709/226 |
| 2011/0145392 | A1 | 6/2011 | Dawson et al. | |
| 2011/0153727 | A1* | 6/2011 | Li | G06F 21/41 709/203 |
| 2011/0213884 | A1* | 9/2011 | Ferris | G06F 9/50 709/226 |
| 2012/0016721 | A1* | 1/2012 | Weinman | G06Q 30/02 705/7.35 |
| 2012/0137002 | A1* | 5/2012 | Ferris | G06F 9/5072 709/226 |
| 2012/0331113 | A1* | 12/2012 | Jain | H04L 41/5025 709/220 |
| 2013/0031028 | A1* | 1/2013 | Martin | G06Q 30/08 705/400 |
| 2013/0111349 | A1* | 5/2013 | Yan | H04L 41/22 715/738 |
| 2013/0117157 | A1* | 5/2013 | Iyoob | G06Q 30/06 705/26.41 |
| 2013/0290538 | A1* | 10/2013 | Gmach | G06F 11/3457 709/226 |
| 2013/0346227 | A1* | 12/2013 | Jain | G06Q 30/08 705/26.3 |
| 2014/0173112 | A1* | 6/2014 | Seago | H04L 67/32 709/226 |
| 2014/0278808 | A1* | 9/2014 | Iyoob | G06Q 30/0206 705/7.35 |
| 2015/0222723 | A1* | 8/2015 | Adapalli | G06Q 10/067 705/26.41 |
| 2015/0365281 | A1 | 12/2015 | Marino et al. | |
| 2016/0360009 | A1 | 8/2016 | Borley et al. | |
| 2016/0261713 | A1* | 9/2016 | Seago | H04L 47/70 |
| 2016/0344595 | A1* | 11/2016 | Jain | G06F 9/5072 |
| 2017/0192825 | A1* | 7/2017 | Biberman | H04L 67/1008 |
| 2017/0357532 | A1* | 12/2017 | Miraftabzadeh | H04L 41/5096 |
| 2019/0158367 | A1* | 5/2019 | Barooah | H04L 67/10 |
| 2019/0171483 | A1* | 6/2019 | Santhar | G06N 20/00 |
| 2019/0286486 | A1* | 9/2019 | Ma | G06F 9/5027 |

OTHER PUBLICATIONS

Microsoft Corporation. "Think Cloud Compliance: An Introduction to Cloud Computing for Legal and Compliance Professionals", 2017, 15 pages. (Year: 2017).*

Cloud Industry Forum. "8 criteria to ensure you select the right cloud service provider", publicly posted Jan. 29, 2017, 12 pages. (Year: 2017).*

International Search Report, dated Jul. 11, 2019, from corresponding International Application No. PCT/US2019/049029.

Written Opinion of the International Searching Authority, dated Jul. 11, 2019, from corresponding International Application No. PCT/US2019/049029.

Collett, Stacy, What is hybrid cloud really, and what's the best strategy?, How to build a hybrid-cloud strategy, Network World, Apr. 13, 2018.

* cited by examiner

SYSTEMS AND METHODS FOR HYBRID BURST OPTIMIZED REGULATED WORKLOAD ORCHESTRATION FOR INFRASTRUCTURE AS A SERVICE

RELATED APPLICATIONS

This application claims the benefit of U.S. Provisional Patent Application Ser. No. 62/724,667, filed Aug. 30, 2018, the disclosure of which is hereby incorporated, by reference, in its entirety.

BACKGROUND OF THE INVENTION

1. Field of the Invention

The present disclosure generally relates to hybrid burst optimized regulated workload orchestration for infrastructure as a service.

2. Description of the Related Art

Organizations typically have an organization-wide grid infrastructure that is capable of supporting computationally intensive workload. Such infrastructures often provide a stable and efficient platform for hosting business critical workloads that have strong Service Level Agreements (SLAs) that often have regulatory implications for failure to meet those SLAs.

Applications running in this environment often "purchase" capacity to meet their "peak" requirements to ensure that the SLAs are met. The peak requirement, however, may only be required for a fraction of the day, while the remainder of the time the compute capacity is left idle by the funding application. In some cases, workloads can be very seasonal, and only require large scale compute for a few months of the year (e.g., Comprehensive Capital Analysis and Review stress testing), or a few days a month.

SUMMARY OF THE INVENTION

Systems and methods for hybrid burst optimized regulated workload orchestration for infrastructure (IaaS) as a service are disclosed. According to one embodiment, in an information processing apparatus comprising at least one computer processor, a method for providing hybrid burst optimized regulated workload orchestration for infrastructure as a service may include: (1) receiving a job request for a job comprising at least one job requirement from a job requester; (2) calculating a cost of job for the job based on the at least one job requirement; (3) identifying an IaaS provider from a plurality of IaaS providers that meets the job requirements and the cost of job, wherein the plurality of IaaS providers comprises at least one on-premises IaaS provider and the at least one off-premises IaaS provider; (4) executing an IaaS request for the identified IaaS provider; and (5) monitoring execution of the job by the identified IaaS provider.

In one embodiment, the job requirement may include hardware requirements for the job. The job requirement may further include a legal requirement for the job, a service level agreement requirement for the job, etc.

In one embodiment, the method may further include verifying that at least one IaaS provider in the plurality of IaaS providers meets the at least one job requirement before calculating the cost of job.

In one embodiment, the step of calculating a cost of job for the job based on the at least one job requirement may further include: retrieving a past IaaS selection and job runtime attributes for a previous job; enriching the job requirements with the past IaaS selection and job runtime attributes; and calculating the cost of job based on the enriched job requirements.

In one embodiment, the cost of job may be further based on a cost associated with the IaaS providers.

In one embodiment, the IaaS request may include a request for the identified IaaS provider to provision resources for the job.

In one embodiment, the method may further include providing the job requester with an identification of the identified IaaS provider.

In one embodiment, the step of monitoring execution of the job by the identified IaaS provider may include updating runtime attributes for the job based on a status of the job execution.

In one embodiment, the method may further include releasing the provisioned resources for the job upon job completion.

According to another embodiment, a system for providing hybrid burst optimized regulated workload orchestration for infrastructure as a service, may include a job requestor electronic device configured to submit a job request for a job; an electronic device configured to execute a brokerage service computer application that receives the job request; at least one on-premises IaaS provider; and at least one off-premises IaaS provider. The brokerage service computer application may receive the job request from the job requestor electronic device; may calculate a cost of job for the job based on the at least one job requirement; may identify an IaaS provider from the at least one on-premises IaaS provider and the at least one off-premises IaaS provider; may execute the IaaS request for the identified IaaS provider; and may monitor execution of the job by the identified IaaS provider.

In one embodiment, the job requirement may include hardware requirements for the job. The job requirements may also include a legal requirement for the job, a service level agreement requirement for the job, etc.

In one embodiment, the brokerage service computer application may verify that at least one IaaS provider in the network of the plurality of IaaS providers meets the at least one job requirement before calculating the cost of job.

In one embodiment, the cost of job for the job may be further based on enriched job requirements, the enriched job requirements comprising the job requirements enriched with a past IaaS selection and job runtime attributes for a previous job.

In one embodiment, the cost of job may be further based on a cost associated with the IaaS providers.

In one embodiment, the IaaS request may include a request for the identified IaaS provider to provision resources for the job.

In one embodiment, the brokerage service computer application may provide the job requester with an identification of the identified IaaS provider.

In one embodiment, the brokerage service computer application may update runtime attributes for the job based on a status of the job execution.

In one embodiment, the brokerage service computer application may release the provisioned resources for the job upon job completion.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Figure 1:
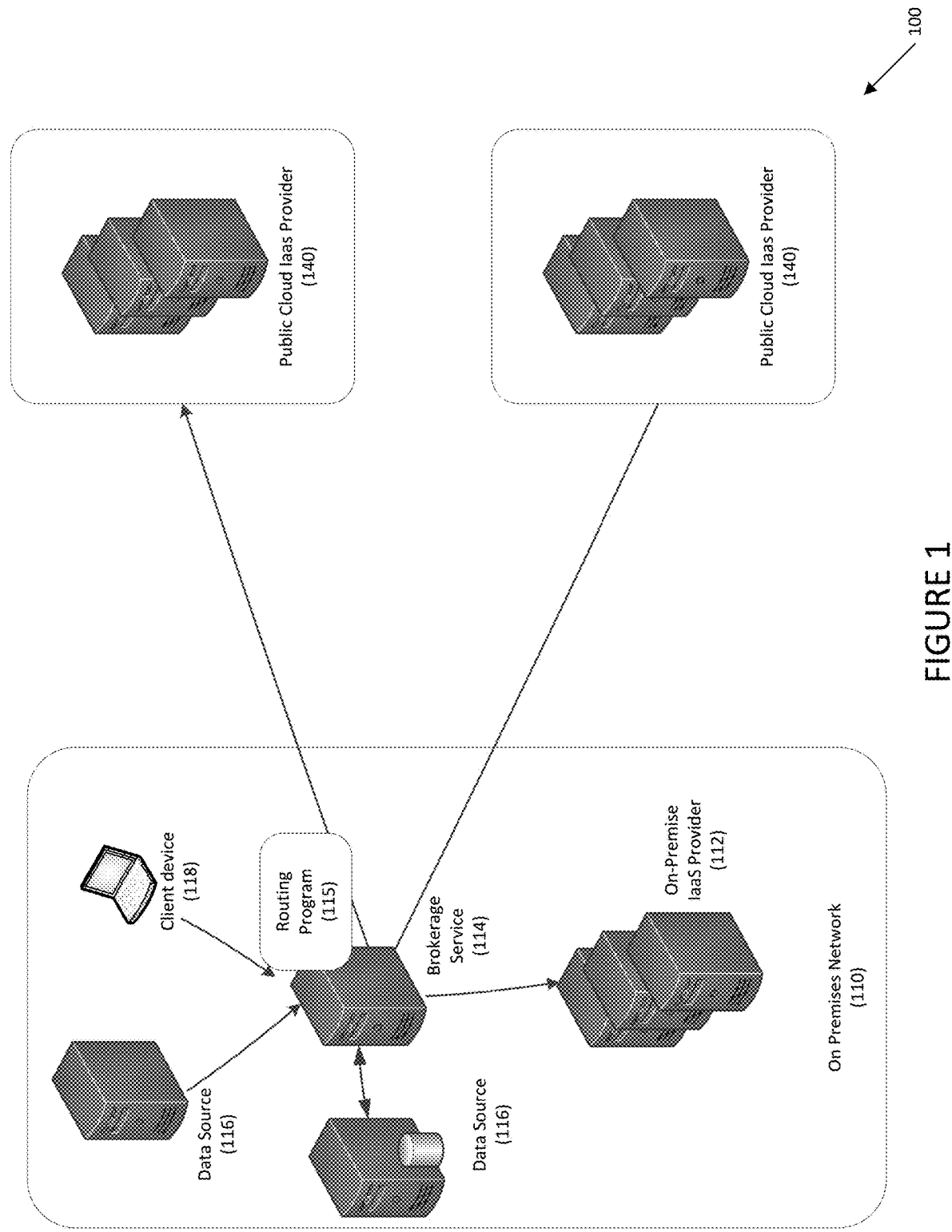
FIG. 1 discloses a system for hybrid burst optimized regulated workload orchestration for infrastructure as a service according to one embodiment.

Systems and methods for hybrid burst optimized regulated workload orchestration for infrastructure as a service are disclosed.

The following definitions are used herein:

Cluster—a group of compute servers that acts as a combined destination for a computational workload;

On-premise cluster—a cluster comprised of commodity servers hosted within an organization's data centers;

Public cloud or off-premise cluster—a cluster comprised of compute (and or storage) instances provided by external vendors (e.g., AWS, Azure, Google Cloud, etc.);

Workloads—sets of computational jobs organized to achieve a specific goal;

Hybrid burst—carving out compute (and or storage) instances on either on premise or off-premise clusters to execute workloads;

IaaS—Infrastructure as a Service;

SLA—Service Level Agreement; and

SKU—Stock Keeping Units (i.e., a product or service identification code).

It should be noted that although the disclosure may be in the context of a public cloud, the disclosure is not so limited. The public cloud is an example of an IaaS that embodiments of the hybrid burst platform can exploit as a consequence of a flexible policy based approach to brokerage. It is generally less expensive to execute burst workloads with unused capacity within on-premises clusters rather than build short-lived capacity on public cloud providers. Bursting workload on premises may lead to contention for on-premises capacity; therefore, it may be necessary to build clusters on public cloud even if burst would be less expensive on-premises (e.g., for large enterprises with significant committed compute capability). Embodiments may be directed to identifying the right blend of on-premises burst and off-premises (e.g., public cloud) burst.

Embodiments may be directed to minimizing a Cost of Job (CoJ) at any given time. For example, the CoJ may be based on two parameters: Job Requirements (JobReq) and a Job Tab (JobTag).

JobReq may include a description of the resources, legal, SLA and other requirements of a job. Resource requirements may be relative to a baseline SKU for CPU and GPU, and may identify a certain number of CPU cores and GPU processors relative to that base SKU (e.g., the base compute units may be a CBB2 equivalent CPU core and GPU device). For example, SKUs may be used to set the minimum technical requirements on the resources to use (e.g., a particular processor or GPU type, and hence the features required to complete the computation).

Storage may be supplied as a requirement for capacity (e.g., gigabytes) and/or IOPS (I/O operations per second). Legal requirements may include constraints such as geographical and/or jurisdictional restrictions on the location at which the workload is run. SLA requirements may include, for example, deadlines for job completion.

JobTag may include a unique identifier for the type of workload. This may allow for similar workloads to be grouped together for optimization. Actual job runtimes may be fed back into the model to better estimate future execution of similar workloads of the same type. Thus, machine learning may be used to optimize the model. For example, once the brokerage service has run a workload of a particular JobTag and has a history of the resources required in executing that type of workload, future submissions may only require the submission of a JobTag and SLA with no specification of resources. The brokerage service may then adjust resource requirements accordingly.

In embodiments, each IaaS offering may have common features, such as liquidity, resource guarantee period, performance, and constraints. Liquidity may reflect the expected latency to obtain all the desired resources required by the job based on the JobTag and JobReq. Resource Guarantee Period may reflect the expected period where obtained IaaS resources can be held. Some IaaS providers do not provide guarantees of how long obtained resources can be held before they are forcibly reclaimed, but it is possible to establish the expected period given the supplied time point (i.e., t) and historical experiences.

Performance may reflect the relative performance of the IaaS offerings. A particular IaaS provider may have several potential resource offerings for a particular job type, and each resource offering may be reflected separately.

Constraints may be binary indicators that may lead to the exclusion of particular IaaS choices based on the requirements supplied in JobReq. Constraints may be associated with regulatory constraints, legal constraints, etc. In embodiments, regulated workloads and their data classification may be mapped to IaaS provider security and certification levels.

Liquidity, resource guarantee period, and performance may be generally related to meeting the SLA requirements for the Job. These features may be independently represented by a different model appropriate to that feature.

Intuitively this may be described as:

Expected Cost of Job (CoJ) for IaaS Offering i=Price of offering i such that SLA requirements and other constraints are met. More concretely, this can be expanded to a constrained optimization problem $$CostJob_t = \min_i S_i(X_t) \text{ such that}$$

$$\begin{bmatrix} L_{1t}(X_t) & R_{1t}(X_t) & F_{1t}(X_t) \\ L_{2t}(X_t) & R_{2t}(X_t) & F_{2t}(X_t) \\ \dots & \dots & \dots \\ L_{nt}(X_t) & R_{nt}(X_t) & F_{nt}(X_t) \end{bmatrix} \begin{bmatrix} w_1 \\ w_2 \\ w_3 \end{bmatrix} = \begin{bmatrix} S_{1t}(X_t) \\ S_{2t}(X_t) \\ \dots \\ S_{nt}(X_t) \end{bmatrix} \text{ and}$$

$$g\left( \begin{bmatrix} C_{11} & \dots & C_{1m} \\ C_{21} & \dots & C_{2m} \\ \dots & \dots & \dots \\ C_{n1} & \dots & C_{nm} \end{bmatrix} \begin{bmatrix} I_{x1t} \\ \dots \\ I_{xmt} \end{bmatrix} \right) \leq \begin{bmatrix} Q_1(X_t) \\ Q_2(X_t) \\ \dots \\ Q_n(X_t) \end{bmatrix}$$

The linear weighted combination of the feature vector functions gives the cost of job for that offering given the constraints imposed by the offerings.

Each row i in the vector formulation reflects individual IaaS provider offering. This may be applicable IaaS offerings for public cloud service providers, or an on-premises IaaS provider like ICP (Integrated Compute Platform).

$L_{it}$ represents the liquidity model value at time t for offering i;

$R_{it}$ represents the resource guarantee model value at time t for offering i;

$F_{it}$ represents the performance model value at time t for offering i;

$X_t$ represents the job requirements in term of resources needed at time t, the vector dimension is not specified at this point;

$W_i$ represents weighting for cost features of interest;

$S_{it}$ represents the total cost at time t for offering i;

$C_{ij}$ represents the constraint item j for offering i;

$I_{xit}$ represents a job-specific indicator of whether a constraint i is applicable for that job;

$Q_{it}$ represents the constraint requirement from the job at time t for offering i; and g(.) is a transformation function from the constraint domain space to constraint threshold space.

The Stochastic matrices (e.g., $L_{it}$, $R_{it}$, $F_{it}$) may share the same model across multiple offerings. These features may be time series models, although they may also be treated as Markov decision processes. The best models, however, may be selected as necessary and/or desired.

By modelling the CoJ, the total cost of the job for its complete duration may be calculated, and the best IaaS provider may be selected to execute that workload at any given time. For example, if job requirements are met, and the IaaS provider is the least expensive, it may be the deemed the best IaaS provider.

In embodiments, a single IaaS offering may have exceptional or scheduled liquidity restrictions that may reduce the total capacity of all IaaS offerings and in the face of fixed demand will see liquidity for other offerings diminish. This may represent a correlation between $L_{it}$ (e.g., $L_{1t}$, $L_{2t}$, $L_{3t}$, . . . $L_{nt}$). This correlation, however, is not modeled in the above formulation. Instead, $L_{it}$ is treated as an independent function.

In embodiments, mapping of resource requirements to specific IaaS offerings may be managed using a "recipe" approach that may map baseline resource requirements to a specific combination of instance types and cluster topology required for a specific IaaS provider. A recipe may also encapsulate the best choices for a particular JobTag because it can learn from past executions of workload with that JobTag; thus, a recipe can choose resource requirements for a particular IaaS offering on behalf of a job to meet an SLA requirement.

In one embodiment, a distributed ledger, such as a Blockchain-based distributed ledger, may be used to bind the client and the IaaS service provide to a new pricing scheme for a particular recipe for a particular time period. This may allow the negotiation and binding to be dynamic and autonomous (within some boundaries) by the brokerage service.

Referring to FIG. 1, a system for hybrid burst optimized regulated workload orchestration for infrastructure as a service is disclosed according to one embodiment. System 100 may include on-premises network 110 and one or more public cloud IaaS provider 140. Although two public cloud IaaS providers are depicted in FIG. 1, it should be recognized that a greater or fewer number of public cloud IaaS providers 140 may be provided as is necessary and/or desired.

On premises network 110 may include on-premises IaaS provider 112, brokerage service 114, and data sources 116. In one embodiment, brokerage service 114 may include a server executing routing computer program 115. Data sources 116 may be servers, systems of record, terminals, databases, etc. that may provide a client job application and job and IaaS attributes to routing program 115. In one embodiment, a client (not shown) may provide client job application and/or job and IaaS attributes via client device 118. Examples of client device 118 include workstations, desktop computers, notebook computers, tablet computers, Internet of Things (IoT) appliances, ATMs, kiosks, servers, etc.

Routing program 115 may route a job associated with the client job application to on-premises IaaS provider 112 and/or one or more public cloud IaaS provider 140. In one embodiment, routing program 115 may receive parameters/features for the workload (e.g., JobTag, JobReq, etc.), and features of the IaaS providers (e.g., on-premises resources 112 and/or public cloud IaaS provider 140), and may route the workload to the appropriate IaaS provider based on, for example, cost. In one embodiment, optimizations are encapsulated in the CostOfJob model.

In one embodiment, routing program 115 may use machine learning to route a workload having a specific JobTag without requiring a detailed review of the IaaS resource features.

Figure 2:
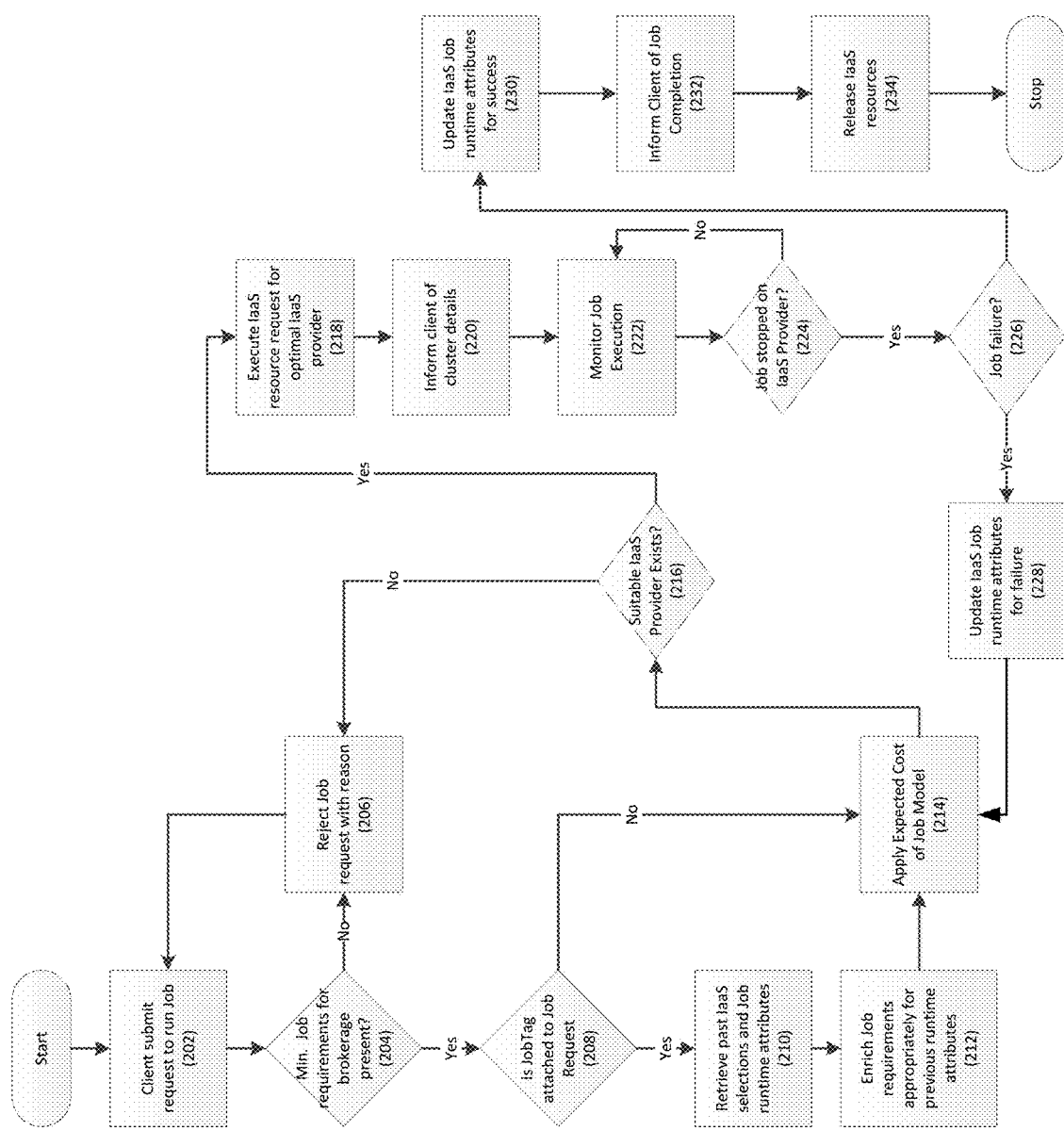
FIG. 2 discloses a method for hybrid burst optimized regulated workload orchestration for infrastructure as a service according to one embodiment.

Referring to FIG. 2, a method for hybrid burst optimized regulated workload orchestration for infrastructure as a service is disclosed according to one embodiment.

In step 202, a service may receive a request from a client to run a job. The request may be received from any suitable client device, from a program, etc.

In one embodiment, the job submission may include the job requirements (e.g., JobReq).

In step 204, a check is made to see if there is an IaaS provider that meets the minimum job requirements for the job. For example, the job requirements (e.g., JobReq) may be compared to the resources of the IaaS providers to make sure there is IaaS provider that can meet the job requirements. For example, of a job requirement require the job to be run only on the U.S. west coast due to regulatory policy, so a check is made to see if there is an IaaS provider on the U.S. west coast. If there is no available IaaS provider, in step 206, the job may be rejected, and a reason may be provided for the rejection.

If there is an IaaS provider that meets the minimum job requirements for the job, in step 208, a check is made to see if a unique identifier for the type of workload (e.g., a JobTag) is attached to the job. If it is not, an estimated cost of job (e.g., CoJ), such as the resources required for the job, may be calculated in step 214 using an expected cost of job model, such as is described above.

If a unique identifier is present, in step 210, past IaaS selections and job runtime attributes are retrieved from, for example, from memory, and in step 212, job requirements may be enriched for previous runtime attributes. After the enrichment, in step 214, the expected cost of job (e.g., CoJ) may be calculated in step 214.

In step 216, based on the estimated cost of job, a check may be made to see if a suitable IaaS provider exists. If there is not a suitable IaaS provider, either on-premises or in a public cloud, in step 206, the job may be rejected and a reason may be provided.

In one embodiment, the identification of a suitable IaaS provider may be based on the CoJ.

If a suitable IaaS provider exists, an IaaS request for the optimal IaaS provider may be executed. In one embodiment, this may request the IaaS provider to provision resources for the job and/or to prepare to run the job.

In step 220, the client (i.e., the job requester) may be informed of the IaaS provider for the job. For example, this may include an identification of the IaaS provider, resource details (e.g., number of CPUs, GPUs, etc.). The execution of the job may be monitored in step 222.

If the job stops in step 224, and the stoppage is a result of a job failure in step 226, the IaaS job runtime attributes may be updated in step 228. If the job stops for a reason other than failure (i.e., job execution is complete), in step 230, the IaaS job runtime attributes may be updated for success, and in step 232, the client may be informed of job completion. The IaaS resources may then be released in step 234.

The disclosures of U.S. Patent Application Ser. No. 62/430,979, filed Dec. 7, 2016, and U.S. patent application Ser. No. 15/816,820, filed Nov. 17, 2017, are hereby incorporated, by reference, their entireties.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing hybrid burst optimized regulated workload orchestration for infrastructure as a service (IaaS), comprising:
in an information processing apparatus comprising at least one computer processor:
receiving a job request for a job from a job requester, wherein the job request comprises: a legal requirement for the job and a service level agreement requirement for the job, wherein the legal requirement comprises at least one of a geographical restriction and a jurisdictional restriction on a location where the job is executed;
calculating a cost-of-job for the job, wherein the cost-of-job is calculated based on:
a job requirement parameter, wherein the job requirement parameter includes a description of computing resources, the legal requirement for the job, and the service level agreement requirement for the job; and
a job tag comprising a unique identifier for a type of workload associated with the job request, wherein the job tag identifies a similar type of workload associated with a subsequent job request;
identifying an IaaS provider from a plurality of IaaS providers that meets the job requirement parameter and the cost-of-job, wherein the plurality of IaaS providers comprises at least one on-premises IaaS provider and at least one off-premises IaaS provider;

executing an IaaS request for the identified IaaS provider; and monitoring execution of the job by the identified IaaS provider.

2. The method of claim 1, where the job requirement parameter further comprises hardware requirements for the job.

3. The method of claim 1, further comprising:

verifying that at least one IaaS provider in the plurality of IaaS providers meets the job requirement parameter before calculating the cost-of-job.

4. The method of claim 1, wherein the step of calculating the cost-of-job for the job comprises:

retrieving a past IaaS selection and job runtime attributes for a previous job;

enriching the job requirement parameter with the past IaaS selection and job runtime attributes; and calculating the cost-of-job based on the enriched job requirements.

5. The method of claim 1, wherein the cost-of-job is further based on a cost associated with each of the plurality of IaaS providers.

6. The method of claim 1, wherein the IaaS request comprises a request for the identified IaaS provider to provision resources for the job.

7. The method of claim 1, further comprising:

providing the job requester with an identification of the identified IaaS provider.

8. The method of claim 1, wherein the step of monitoring execution of the job by the identified IaaS provider comprises:

updating runtime attributes for the job based on a status of the job execution.

9. The method of claim 6, further comprising:

releasing the provisioned resources for the job upon job completion.

10. A system for providing hybrid burst optimized regulated workload orchestration for infrastructure as a service (IaaS) comprising at least one server including a processor, wherein the server is configured to:

receive a job request for a job from a job requester, wherein the job request comprises a legal requirement for the job and a service level agreement requirement for the job, wherein the legal requirement comprises at least one of a geographical restriction and a jurisdictional restriction on a location where the job is executed;

calculate a cost-of-job for the job, wherein the cost-of-job is calculated based on:

a job requirement parameter, wherein the job requirement parameter includes a description of computing resources, the legal requirement for the job, and the service level agreement requirement for the job; and a job tag comprising a unique identifier for a type of workload associated with the job request, wherein the job tag identifies a similar type of workload associated with a subsequent job request;

identify an IaaS provider from a plurality of IaaS providers that meets the job requirement parameter and the cost-of-job, wherein the plurality of IaaS providers comprises at least one on-premises IaaS provider and at least one off-premises IaaS provider;

execute an IaaS request for the identified IaaS provider; and monitor execution of the job by the identified IaaS provider.

11. The system of claim 10, wherein the job requirement parameter comprises hardware requirements for the job.

12. The system of claim 10, wherein the server is further configured to verify that at least one IaaS provider in the plurality of IaaS providers meets the job requirement parameter before calculating the cost-of-job.

13. The system of claim 10, wherein the cost-of-job for the job is calculated on enriched job requirements, and wherein the enriched job requirements comprise the job requirement parameter enriched with a past IaaS selection and job runtime attributes for a previous job.

14. The system of claim 10, wherein the cost-of-job is further based on a cost associated with each of the plurality of IaaS providers.

15. The system of claim 10, wherein the IaaS request comprises a request for the identified IaaS provider to provision resources for the job.

16. The system of claim 10, wherein the server is further configured to provide the job requester with an identification of the identified IaaS provider.

17. The system of claim 10, wherein the server is further configured to update runtime attributes for the job based on a status of the job execution.

18. The system of claim 15, wherein the server is further configured to release the provisioned resources for the job upon job completion.

* * * * *